United States Patent [19]

Smith et al.

[11] Patent Number: 4,707,918
[45] Date of Patent: Nov. 24, 1987

[54] POWERED CLIPPER FOR CITRUS FRUITS AND THE LIKE

[75] Inventors: Gerald D. Smith, Blythe, Calif.; Ben E. Werner, Golden, Colo.

[73] Assignee: Agricultural Producers, Valencia, Calif.

[21] Appl. No.: 834,593

[22] Filed: Feb. 28, 1986

[51] Int. Cl.⁴ .............................................. B26B 15/00
[52] U.S. Cl. ....................................................... 30/228
[58] Field of Search ................................... 30/228, 276

[56] References Cited

U.S. PATENT DOCUMENTS

| | | | |
|---|---|---|---|
| 2,600,540 | 6/1952 | Johnson | 30/228 X |
| 3,255,525 | 6/1966 | Frenzel | 30/228 X |
| 4,109,381 | 8/1978 | Pellenc | 30/228 |
| 4,619,047 | 10/1986 | Heckman | 30/276 |

*Primary Examiner*—E. R. Kazenske
*Assistant Examiner*—Willmon Fridie, Jr.
*Attorney, Agent, or Firm*—Evanns & Walsh

[57] ABSTRACT

There is disclosed a device for use in fruit harvesting, that is, for clipping the stems of citrus fruits. The device is organized for one-hand operation, that is, it can be held in one hand or attached to the wrist of one hand, the device having an operating member, that is, a trigger, to be operated by a finger of the user. The device is powered by a pneumatic cylinder which, through linkage, operates a cutting blade which moves relative to a stationary member. Devices are provided for attaching the tool to a person's wrist and a finger of the user with the trigger member or button positioned for easy manipulation.

7 Claims, 10 Drawing Figures

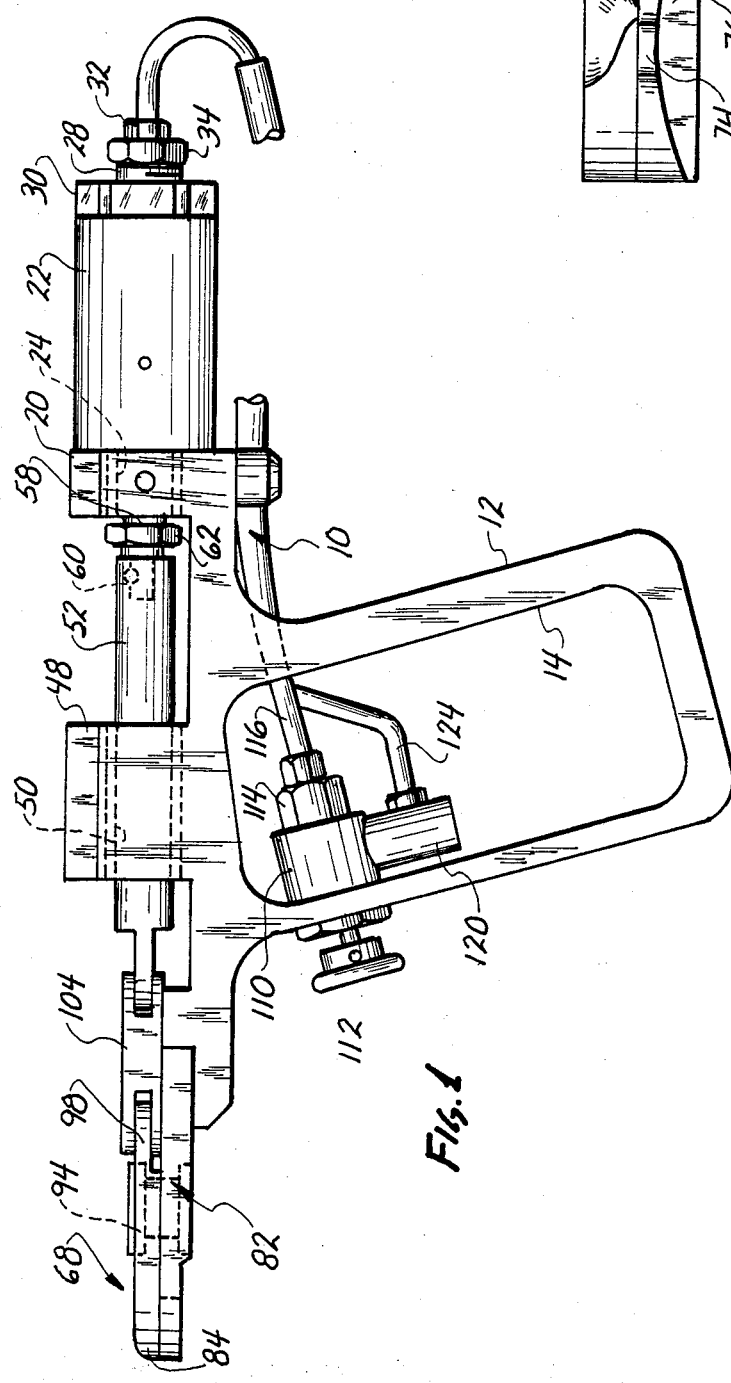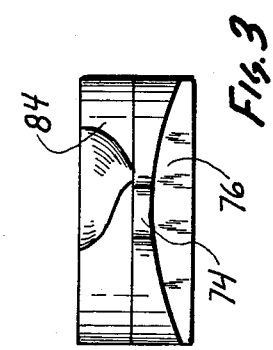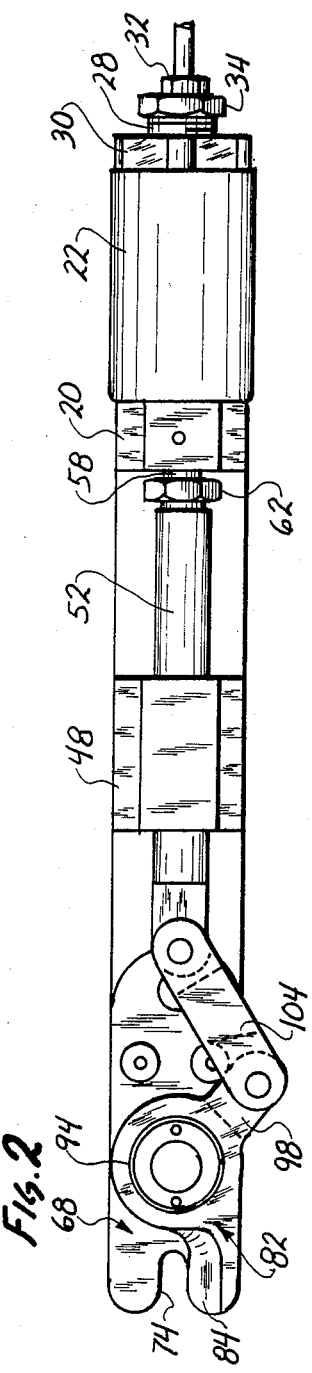

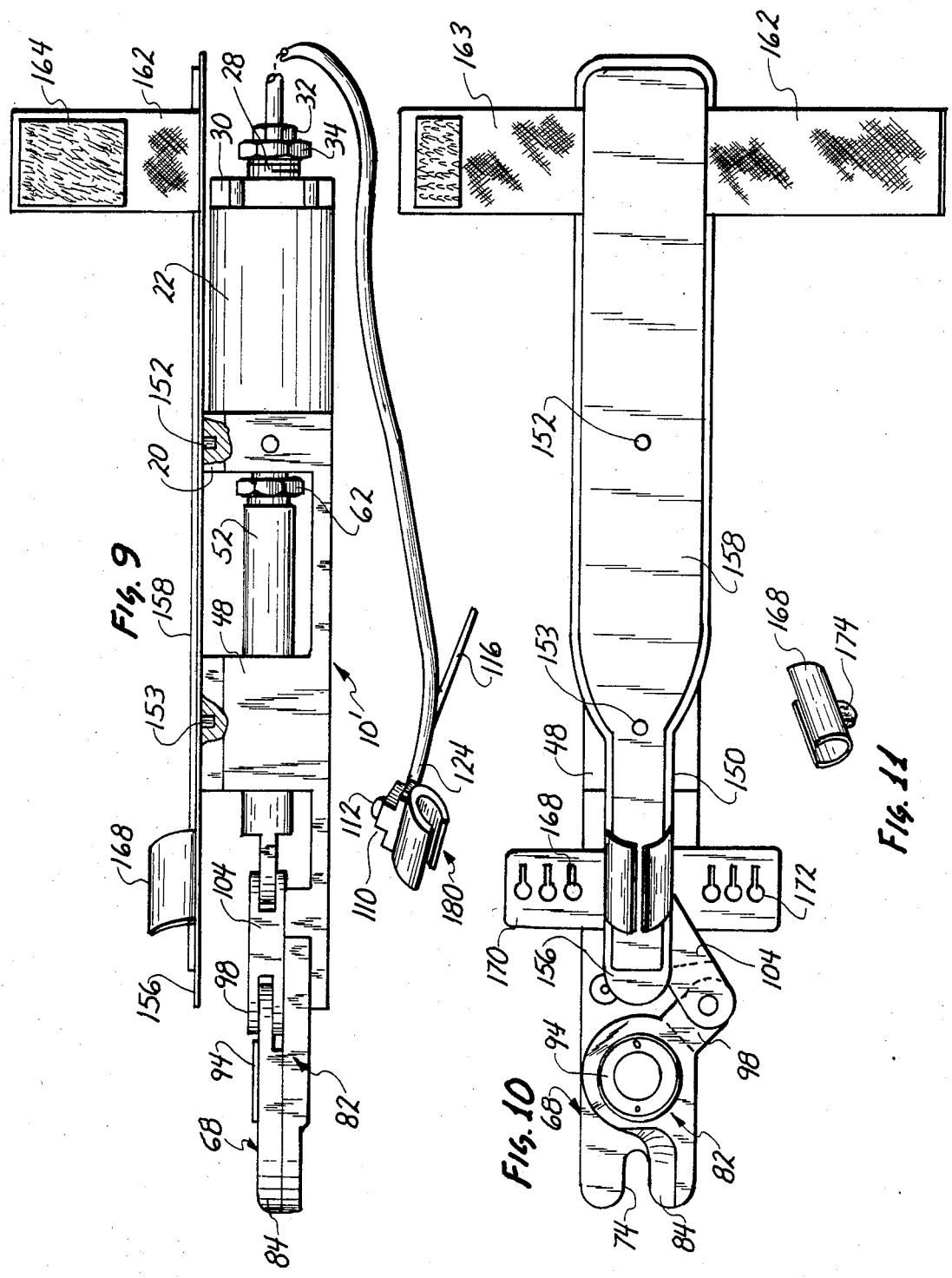

POWERED CLIPPER FOR CITRUS FRUITS AND THE LIKE

BACKGROUND OF THE INVENTION

1. Field of the Invention

The field of the invention is that of fruit harvesting, such as the harvesting of citrus fruits, such as, for example, oranges, lemons, and the like. The field of the invention is more particularly that of a tool for doing the harvesting, that is, clipping the stem of the fruit for releasing it to be gathered.

2. Description of the Prior Art

Having reference to the harvesting of fruit, for example, oranges, typically the individual worker doing the harvesting has had to stand on a ladder and clip the stem of every orange. Currently, the harvesting has been done in this manner, which is the same as it has been done for many generations.

Typically, in the past it has been necessary to make two clips of the stem, that is, after the first clip has been made, the rest of the stem sticking up from the fruit, that is, the orange, had to be clipped off because otherwise this would damage other fruit.

With respect to any instruments or tools that have been known to be used in fruit harvesting, it appears that there is little or no information available, although it is believed that an instrument on the order of a spring-loaded scissors has been used.

With respect to any known prior art, U.S. Pat. No. 3,915,043 is mentioned, although this patent is in an entirely different field. It is a cable or line-cutting device to be used with an airplane for severing cables or other lines when mounted on an agricultural aircraft in the event that the aircraft should inadvertently strike them. This device does embody a power-operated cutter.

A distinct need exists for an instrument or tool for use in connection with the harvesting of fruit, and the invention as described in detail hereinafter was originated for the purpose of fulfilling that need.

SUMMARY OF THE INVENTION

A preferred form of the invention is described in detail hereinafter and illustrated in the drawings.

In a preferred form of the invention, it is constructed for manual, one-handed use. That is, the instrument or tool can be held in one hand and operated by a trigger button manipulatable by that hand. A base member is provided, at one end of which is a flat part having a conformation preferably in the form of a slot configured to have the stem of the fruit engaged in the slot. A cutter plate is mounted to move parallel to, and closely adjacent, the slot for cutting the stem of the fruit. In the preferred form of the invention, the cutter blade is part of a rotary member which is mounted on a stem or post for rotary, that is, angular, movement. The rotary or angularly movable member has an arm extending at an angle for purposes of having the rotary or angular movement transmitted to it. On the base is a driving member or stem preferably aligned with the radius of the angularly movable blade member. This driving stem is mounted in a bearing on the base to facilitate its reciprocatory movement. Carried on the base is a power cylinder which preferably is a pneumatic cylinder having a piston and return spring which is connected to the reciprocating member or stem.

A source of driving air, that is, compressed air, is provided for operating the tool and preferably is a tank or cannister constructed to be carried by the user as a backpack. A three-way valve is provided in the air line from the source of air pressure, the three-way valve being operated preferably by a trigger button. The valve and trigger button are positioned so that the tool can be held in one hand with the trigger button in a position to be operated by a finger of the user. Actuation of the button allows the three-way valve to admit air to the cylinder for driving it so as to reciprocate the driving stem and to move the cutter blade angularly for cutting off the stem of the fruit.

The tool is of very sturdy construction but yet light in weight so as to not subject the user to fatigue.

In a preferred form of the invention, the tool may have a speed of 2,200 clips per hour, that is, one clip per 0.6111 seconds. A considerable shearing force may be required in an amount of, for example, 40 foot pounds. Thus, the air or pneumatic cylinder is constructed to provide the necessary driving force to provide the cutter blade with the necessary shearing force. In a preferred form of the invention, the reciprocating driving stem is connected to the arm on the cutter member by a link so that when the stem reciprocates, force is transmitted through the link to the extending arm on the rotary cutter blade member to impart angular movement to it. This type of driving arrangement enables the tool to have the necessary driving power, that is, the power to produce the necessary shearing force but yet in an assembly which is relatively light in weight. The link member or linkage provides the necessary mechanical advantage so that the blade has the necessary shearing force.

In one form of the invention, the tool is constructed to have a pistol grip with the trigger button for the control valve in the position of a typical trigger. In another form of the invention, the tool is provided with a holder or saddle so that it can be mounted on a finger of the user with the trigger button in position to be operated by the thumb.

In light of the foregoing, the primary object of the invention is to make available a power-driven clipping tool for clipping the stems of fruit, particularly citrus fruit.

A further object is to make available an instrument or tool as in the foregoing which is constructed so as to have sufficient power to develop the necessary shearing force for the cutting blade so as to be able to shear the stems of fruit and so that the tool is still light enough to be used by a user without undue fatigue.

A further object is to make available a tool as in the foregoing wherein the tool is provided with a conformation formed to engage the stem of the fruit, a rotary cutting blade being positioned to move parallel to, and adjacent to, the said conformation, there being provided a pneumatic driving cylinder connected to a reciprocatable stem which is connected by a linkage to the rotary cutting blade for rapidly moving it angularly. Preferably, the pneumatic cylinder is provided with a return spring for returning the cylinder and enabling the tool to be operated at a substantial number of clips per hour.

Another object is to provide a tool as in the foregoing wherein the tool is provided with a pistol grip and an operating trigger in the form of a trigger button controlling a valve which controls air to the pneumatic cylinder.

BRIEF DESCRIPTION OF THE DRAWINGS

FIG. 1 is a side elevation of a preferred form of the tool;

FIG. 2 is a top view of the form of the invention of FIG. 1;

FIG. 3 is a front end view of the tool of FIGS. 1 and 2;

FIG. 9 is a side view of another form of the invention; and

FIG. 10 is a plan view of the tool.

DESCRIPTION OF A PREFERRED FORM OF THE INVENTION AND MODE OF OPERATION

Figure 4:
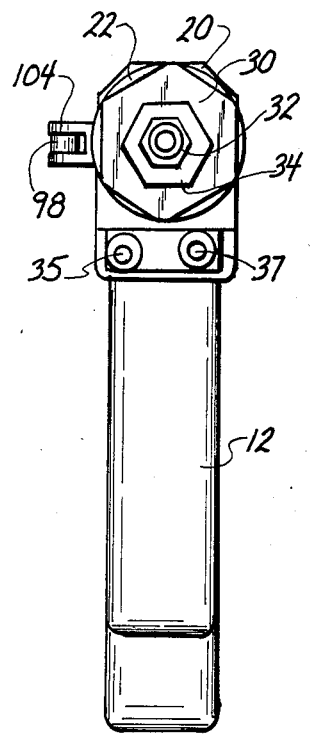
FIG. 4 is a rear end view of the tool of FIGS. 1–3.

Numeral 10 designates the frame of the tool. The frame 10 has depending from it an integral pistol grip type of handle 12, there being an open space 14 within the handle which is rectangular in configuration.

The controls for the tool, including the manually operable trigger button, are carried by the handle 12 and will be referred to again presently.

At the rear end of the frame 10 of the tool is an upstanding bushing, as designated at 20. This part of the tool carries a pneumatic cylinder 22 having an extending end part which fits into a bore 24 in the bushing 20. The pneumatic cylinder 22 has an extending nipple 28, and threaded onto this nipple is a nut 30. The nipple 28 includes a hose fitting 32 for a pneumatic hose, the numeral 34 designating a nut threaded onto the nipple.

FIG. 4 is an end view. Numerals 35 and 37 designate screws.

At an intermediate part of the frame 10 is an upstanding integral bushing 48 having a bore 50 which forms a bearing for a reciprocatable operating stem or push rod 52. The pneumatic cylinder 22 has a piston in it operating against a biasing spring, the piston having extending from it a piston rod 58, the end of which extends into bore 60 in the end of push rod 52. Numeral 62 designates a nut threaded onto the piston rod.

Figure 5:
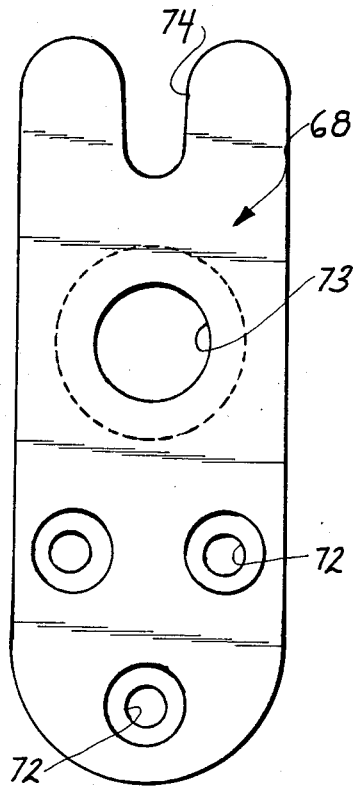
FIG. 5 is a plan view of the front end plate having a slot to receive the stem of the fruit.

At the front end of the tool, there is provided a clipper base or base plate designated by the numeral 68. Base plate 68 is shown more in detail in FIGS. 5 and 6. Plate 68 is secured to the end of the base 10 by way of three flat head screws which extend through openings, which may be seen at 72 in FIG. 5, each of these openings being countersunk as shown for the heads of the screws. It has a mounting hole or bore 73.

Figure 6:
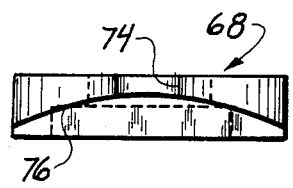
FIG. 6 is an end view of the plate of FIG. 5.

FIG. 6 is an end view of the plate 68. Formed in the end is a slot as designated at 74 which receives the stem of a fruit to be clipped. The surface underneath the end of the blade 68 is formed to be arcuate as shown at 76. See FIG. 3.

Figure 7:
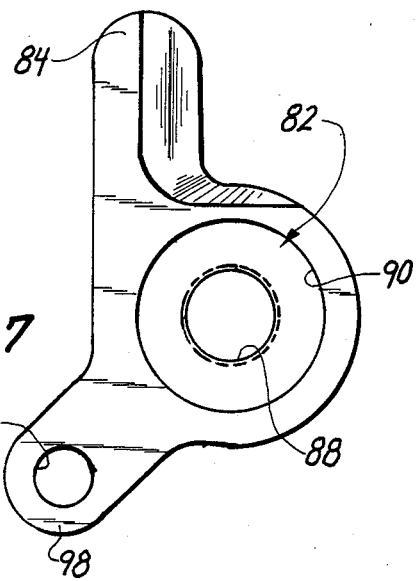
FIG. 7 is a plan view of the cutting blade.
Figure 8:
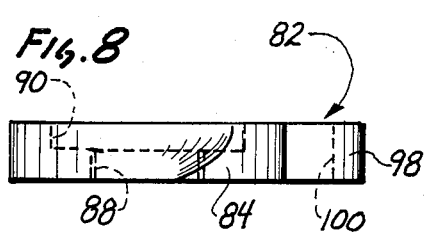
FIG. 8 is an end view of the cutting blade of FIG. 7.

The cutter blade or shearing blade is identified by the numeral 82. The blade itself is identified by the numeral 84 and is cut out as shown to form a sharp cutting edge that moves adjacent to the slot 74. The cutting blade is shown more in detail in FIGS. 7 and 8. It is mounted to be rotatable, that is, to be able to move angularly. The blade has a central bore 88 and a counterbore 90. The blade 82 is rotatable around the shank of a blade screw which has a head 94 that fits into the counterbore 90, the shank fitting into the bore 88 as seen in FIG. 8.

The blade 82 has an angularly extending arm or part 98 having an aperture or opening 100 in it. The arm 98 of blade 82 is connected to the end of the push rod 82 by way of a link 104. The link is connected to the end of the push rod 82 by a link pin and to the end of the arm 98 by a link pin, not shown.

Numeral 110 designates a manually operable three-way valve which is operable by way of a reciprocatable push button or trigger button 112 which is adjacent to the pistol grip 12 so that the operator can readily operate it with one finger. The three-way valve 110 has an end fitting 114 which connects to a final hose line 116 connected to a source of compressed air. Preferably, this is in the form of a tank or cannister arranged to be carried as a backpack by the user of the tool. This arrangement may be conventional equipment and accordingly is not illustrated.

Numeral 120 designates a fitting connected to the three-way valve 110 and which is connected by a vinyl hose 124 to the fitting 32 at the end of the pneumatic cylinder 22. The manually operated three-way valve permits air under pressure to be admitted to the pneumatic cylinder 22 for operating it by admitting air through the line 124. When the trigger button is released, air in the pneumatic cylinder is released through a port, not shown.

From the foregoing, those skilled in the art will readily understand the nature and construction of the invention and the manner in which it operates.

As will be understood from the foregoing, the operator can carry and hold the tool in one hand by clasping the hand grip 12 with one finger in a position to operate the trigger button 112. The source of compressed air in a tank or cannister is carried on the user's back as a backpack with the source of air being connected by the line or tube 116 to the control valve 110.

The operator typically will be standing on a ladder and can position the tool with one hand, bring the stem of a fruit, such as an orange or lemon by way of example, into the slot 74. Then, by actuating the trigger button 112, the shear blade 82 will be moved angularly so that the blade part 84 moves adjacent the slot 74 to shear the stem. As shown, when actuated, the piston in the pneumatic cylinder 22 is moved outwardly so that the push rod 16 exerts a thrust against the end of the link 104 and exerts force against the arm 98 so as to rotate the blade member 82 in a clockwise direction to move the blade 84 itself so as to shear the stem of the fruit. The undercutting or concavity on the underside of the plate 68 facilitates the positioning of the stem of the fruit in the slot and the shearing of the stem.

The construction is particularly unique and the operating arrangements are such that the pneumatically operated piston can exert a strong force on the push rod 52, and due to the mechanical advantage provided by the link 104 connected to the arm 98, a strong and quick action is provided for moving the cutting blade 84 to shear the stem. As indicated in the foregoing, as many as 2200 clips per hour can be made and without fatiguing the operator and in a much faster and more efficient manner than has been possible in the prior art.

FIGS. 9 and 10 illustrate a modified way of having the tool held by the user. The tool itself, as shown in FIGS. 9 and 10, is like that of the previous embodiment with differences that the frame 10 does not have the integral piston grip 12. In this form of the invention, structure is provided for mounting the tool in a position held by the user's wrist and by one finger.

In FIG. 9, numeral 150 identifies a plate having substantially the same width as the frame bosses 20 and 48 and which is attached to these bosses by way of screws as shown at 152 and 153. The plate has a narrower forwardly extending portion 156. Secured to the surface of the plate 150 is a foam pad 158 which may be made of any suitable padding material.

Attached to the end part of the plate 150 is a strap made of webbed material, as designated at 162, the ends of the strap being provided with Velcro tabs or elements as identified at 162 and 163 which hold the ends of the straps together when wrapped around the user's wrists.

Carried at the end of part 156 of the plate 150 is a flexible tubular member 168. The tubular member 168 is carried by a transverse plate member 170 having a plurality of key slots 172 in it. The tubular holder member 168 has a key 174 in the bottom which can be fitted into any one of the key slots 172 so that the holder plate 170 can be adjusted laterally, thus adjusting the lateral position of the tubular holder 168 so that the user can not only choose a finger to be inserted into this holder but can adjust it laterally for maximum convenience in positioning of the tool for one-handed operation while the other hand is available for picking the fruit.

Numeral 180 designates another flexible tubular finger holder which is adapted for being placed on the thumb of the user. This holder carries the three way valve 110 which is the same valve as in the previous embodiment having an operating member or trigger 112. The holder 180 with the three-way valve which is positioned on the thumb of the user can be moved or maneuvered to press the operating button 112 against the first finger of the user.

From the foregoing, it is to be seen that the form of the invention shown in FIGS. 9, 10 and 11 is very highly adapted for one-handed use by the user. It can be used very effectively without undue fatigue for clipping the fruit stems as described in connection with the previous embodiment.

The mode of operation, that is, the utilization, of this form of the invention will be apparent to those skilled in the art. With the tool mounted as described in a position held by the user's wrist and with one finger in the finger holder, the tool can be readily used in a one-handed operation, the user moving the tool around as necessary to make the clips which are, of course, brought about by actuation of the trigger button 112. Thus, it is to be seen that the advantage is present that one-handed operation capability is available, the tool being sufficiently light that this can be done without subjecting the user to undue fatigue.

From the foregoing, those skilled in the art will fully understand the nature of the invention as to both embodiments and the manner in which all of the objects, as set forth in the foregoing, are realized.

The foregoing disclosure is representative of preferred forms of the invention and is to be interpreted in an illustrative rather than a limiting sense, the invention to be accorded the full scope of the claims appended hereto.

What is claimed is:

1. A manually held tool for severing the stems of fruit products and the like comprising, in combination, a support means including an end part having a conformation to engage the stem of a product to be severed, means including at least one cutting blade having a position to be moved relative to said conformation for severing the stem of the product, means providing a rotatable mounting for a part of the said cutting blade, driving means for said cutting blade positioned for rapidly rotating said part whereby to cause said blade to move rapidly relative to said conformation for severing the stem of a product, said driving means including power means having connections to said part whereby, upon the application of power to rapidly rotate said mounting means, said blade passes said conformation, said power means being in the form of an air-operated cylinder, a source of air under pressure, and manually operated valve means for supplying air to said cylinder for operating the tool, the said tool including means for securing the tool to the user's hand for one-handed operation, the said valve means being positioned for operation by the same hand of the user, the said securing means including means for attaching the tool to the user's wrist, and means for attaching said manually operated valve means to a finger of the user for operation of the valve means by the same hand of the user.

2. A tool as in claim 1 wherein a part of the tool is provided with a sleeve member constructed to be used by a finger of the user.

3. A manually held tool for severing the stems of fruit products and the like comprising, in combination, a base having an end part, the said end part having an end conformation adapted to receive the stem of a product to be severed, the said end part being flat, a severing blade mounted to move relative to said conformation and parallel to it for severing a stem, means providing a mounting for said severing blade for angular movement of the blade relative to said conformation, a reciprocatable operating stem, the said severing blade having an extending arm, an operating link connected between the end of said reciprocatable member and said arm, and power means for reciprocating said stem whereby to impart angular movement to said blade through said link for moving the said blade for severing the stem, including an air cylinder, a source of air under pressure and manually operated valve means for controlling a supply of air to said cylinder, the said tool having a part for grasping by the user, a control member for said manually operated valve, said control member being positioned whereby to be operated by a finger of the user while grasping the said part, including means carried by said base providing for securement to a wrist of the user, including a sleeve member carried by said base adapted to receive a finger of the user to accommodate the one-handed operation.

4. A tool as in claim 3 wherein the said manually operated valve means is positioned for operation by a finger of the user on the hand of the user carrying the tool.

5. A tool as in claim 4 including a sleeve member constructed to receive a finger of the user, the said sleeve member being in a position whereby the operating member can be actuated by the same hand of the user.

6. A manually held tool for severing the stems of fruit products and the like comprising, in combination, a base having an end part, the said end part having an end conformation adapted to receive the stem of a product to be severed, the said end part being flat, a severing blade mounted to move relative to said conformation and parallel to it for severing a stem, means providing a mounting for said severing blade for angular movement of the blade relative to said conformation the said end conformation including an inwardly extending recess in the form of a slot positioned for receiving and holding the fruit stem while it is being severed by said blade, a reciprocatable operating stem, the said severing blade having an extending arm, an operating link connected between the end of said reciprocatable member and said arm, and power means for reciprocating said stem whereby to impart angular movement to said blade through said link for moving the said blade for severing the stem, including an air cylinder, a source of air under pressure and manually operated valve means for controlling a supply of air to said cylinder, the said tool having a part for grasping by the user, a control member for said manually operated valve, said control member being positioned whereby to be operated by a finger of the user while holding the said tool.

7. A manually held tool for severing the stems of fruit products and the like comprising, in combination, a support means, means including a single cutting blade having a portion to be moved for severing the stem of the product, driving means for said cutting blade positioning for rapidly moving the blade whereby to sever the stem of the product, the support means having a conformation shaped to receive the stem of a product to be severed, the conformation including an inwardly extending recess, the said severing blade being mounted to move parallel relative to said recess and closely adjacent thereto while the fruit stem is received in the recess wherein the said recess is in the form of an open-ended slot in an end of said support means adapted to hold the stem while being severed.

* * * * *